(12) United States Patent
Kutscher

(10) Patent No.: US 6,264,213 B1
(45) Date of Patent: Jul. 24, 2001

(54) SUSPENSION SYSTEM FOR LAND VEHICLES, IN PARTICULAR MOTOR VEHICLES

(75) Inventor: Eberhard Kutscher, Dettenhausen (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/534,517

(22) Filed: Mar. 24, 2000

(30) Foreign Application Priority Data

Mar. 31, 1999 (DE) .............................................. 199 14 647

(51) Int. Cl.⁷ .................................................. B60G 17/01
(52) U.S. Cl. ...................................... 280/5.514; 280/6.157
(58) Field of Search ............................ 280/5.506, 5.508, 280/5.507, 5.5, 5.502, 5.514, 5.515, 6.157

(56) References Cited

U.S. PATENT DOCUMENTS

5,684,698 * 11/1997 Fujii et al. .............................. 701/38

FOREIGN PATENT DOCUMENTS

| 35 25 367 A1 | 7/1985 | (DE). |
| 41 38 831 A1 | 11/1991 | (DE). |
| 530755-A1 * | 3/1993 | (EP) ................... 280/5.515 |
| 60-255514 * | 12/1985 | (JP) ................... 280/6.159 |

* cited by examiner

Primary Examiner—Paul N. Dickson
Assistant Examiner—Faye M. Fleming
(74) Attorney, Agent, or Firm—Mark P. Calcaterra

(57) ABSTRACT

In a suspension system with ride-height control, the movements of the body to be expected on the basis of longitudinal and/or transverse accelerations of the vehicle are not eliminated. For this purpose, set values are specified for the level of the body in a manner analogous to the movements of the body to be expected.

20 Claims, 2 Drawing Sheets

SUSPENSION SYSTEM FOR LAND VEHICLES, IN PARTICULAR MOTOR VEHICLES

CROSS REFERENCE TO RELATED APPLICATIONS

Priority is claimed under 35 U.S.C. §119 with respect to German Patent Application No. 199 14 647.0-21 filed on Mar. 31,1999.

BACKGROUND OF THE INVENTION

1. Field of the Invention

The invention relates to a suspension system for land vehicles, in particular non-track-bound motor vehicles, with a sensor system which detects the actual values of the positions of the vehicle wheels relative to the vehicle body or chassis and longitudinal and/or transverse accelerations of the vehicle, and with a ride-height control system which controls control elements or assemblies so as to change the actual position of the wheels as a function of a set/actual value comparison between variably specifiable set values for the positions of the wheels and averages over time of the actual values of the abovementioned positions.

2. Description of the Related Art

A suspension system of this kind forms the subject-matter of DE 41 38 831 A1. Here, the signals representing the longitudinal and transverse accelerations of the vehicle are processed in such a way that the pitching or rolling angle of the body during longitudinal or transverse acceleration is reduced.

Suspension systems of the abovementioned type can be of numerous different design configurations.

For example, a vehicle can have any passive suspension system, for example one with mechanical springs and, in parallel with this, a controllable additional suspension system, by means of which additional forces dependent on the vehicle loading can be produced in order to keep the vehicle body at a specified level relative to the vehicle wheels, to a very large extent independently of disturbing forces.

The prior art also includes pneumatic spring systems whose pneumatic spring units, generally pneumatic bellows, can be connected to a pneumatic pressure source and/or to atmosphere by a corresponding control system, making it possible to establish a specified level by supplying or discharging air to or from the pneumatic spring unit.

In hydropneumatic suspension systems, hydraulic displacer units are arranged between the vehicle body and the vehicle wheels, their displacer working space communicating with a, generally pneumatic, spring energy store. The vehicle body can be raised or lowered relative to the wheels or to individual wheels by supplying or discharging hydraulic medium to or from the hydraulic displacer unit, thus once again allowing a specified level to be established.

Finally, it is possible on fundamentally any suspension systems, particularly those with mechanical spring elements, to arrange in series with each or with specified spring elements a hydraulic displacer unit which forms an adjustable body-side or wheel-side abutment for the respective spring element. Here, it is possible, by supplying or discharging hydraulic medium, to perform adjustment of the height of the body relative to the respective vehicle wheels and hence to achieve ride-height control.

To keep down the control outlay required and, in particular, the power requirement for the control elements or assemblies for changing the actual position of the wheels relative to the body, DE 35 25 367 A1 discloses subjecting the actual-value signals for the position of the vehicle wheels relative to the body to low-pass filtering. This ensures that only correspondingly slow or prolonged level changes are eliminated and that the control system does not respond to normal suspension travel. Here, use is made of the fact that low-pass filtering of a signal leads to averaging of the signal over time, the period of time over which the averaging is carried out being determined by the limit frequency of the low-pass filter.

The present invention is directed towards one or more of the problems set forth above.

BRIEF SUMMARY OF THE INVENTION

It is then the object of the invention to ensure optimum operating behaviour in suspension systems with slow-acting ride-height control.

According to the invention, this object is achieved by virtue of the fact that movements of the body to be expected on the basis of longitudinal and/or transverse accelerations of the vehicle are not eliminated since the set values are changed in accordance with the movement of the body to be expected.

The invention is based on the general idea of not eliminating level changes initiated by accelerations of the vehicle.

This takes account of the fact that a slow-operating ride-height control system is capable of only delayed elimination of the pitching movements which occur during braking or acceleration maneuvers of the vehicle and of the rolling movements of the vehicle body which occur during cornering. This can lead to very undesirable phenomena. If, for example, a ride-height control system responds during braking of the vehicle and counteracts the tendency of the front of the vehicle to dip and the tendency of the rear of the vehicle to rise, this results temporarily in a state in which the level of the front of the vehicle is significantly above, and the level of the rear of the vehicle is significantly below, a desired set value upon completion of the braking maneuver, with the result that the ride-height control system has to intervene again.

The invention furthermore takes account of the fact that, in modern vehicle designs, predetermined changes in the camber and track of the wheels generally occur during pitching and/or rolling movements of the vehicle body in order to effect appropriate support for the respective driving state of the vehicle on the roadway. Here, a ride-height control system could lead in certain circumstances to unwanted impairment of the road-holding of the vehicle.

Finally, it is advantageous that, by virtue of the measures according to the invention, the power requirement for the ride-height control system can be further significantly reduced. This makes it possible to make available suspension systems with ride-height control even for vehicles which should or must operate in a particularly energy-saving manner.

Otherwise, attention is drawn as regards preferred features of the invention to the claims and to the following explanation of the drawing, with reference to which particularly preferred variant embodiments of the invention are described.

DETAILED DESCRIPTION OF THE INVENTION

Figure 1:
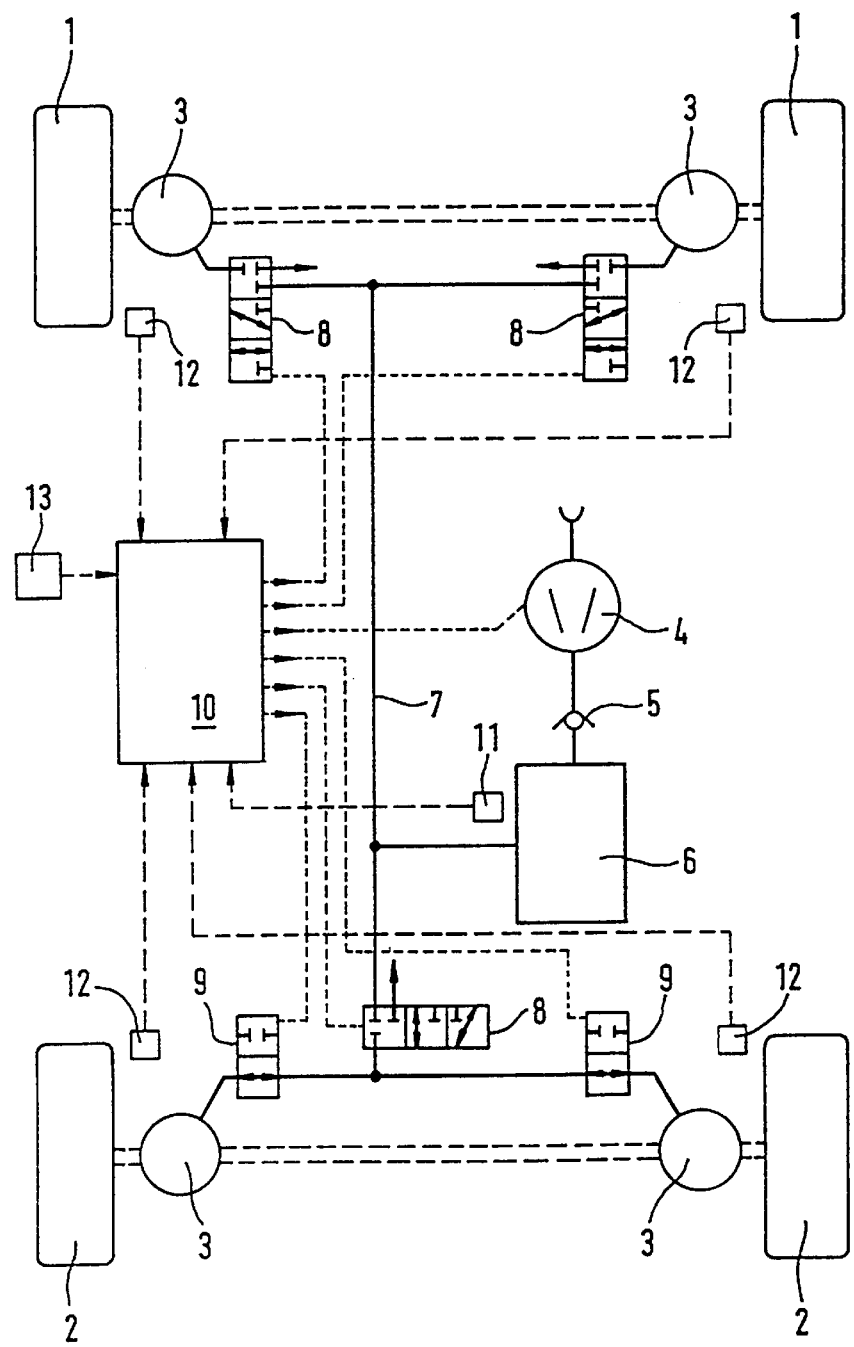
FIG. 1 shows a schematic representation of a pneumatic suspension system with pneumatic suspension and ride-height control and FIG. 2 shows a diagram which reproduces changes in the level of the vehicle body relative to various wheels when parameters relating to vehicle dynamics change.

According to FIG. 1, a vehicle (not shown in greater detail) has, in plan view, two front wheels 1 and two rear wheels 2, each with associated pneumatic spring elements 3, which can be designed in a conventional manner as pneumatic spring bellows.

To supply the pneumatic spring elements 3 with compressed air a compressor 4 is provided and this is connected on the delivery side to a pneumatic accumulator 6 via a nonreturn valve 5.

The accumulator 6, for its part, can be connected to the pneumatic spring elements 3 via a pneumatic line network 7, it being possible, by means of control and shut-off valves 8 and 9, to connect the pneumatic spring elements 3 individually or jointly to the accumulator 6 or to atmosphere or to shut them off relative to atmosphere and to the accumulator 6. In this way, it is possible in a controlled manner to feed compressed air to the pneumatic spring elements 3 or to discharge compressed air from the spring elements 3 or to maintain unchanged the quantity of air enclosed in the respective pneumatic spring element 3.

The valves 8 and 9 are controlled by means of a controller 10, which also controls the compressor 4.

For control of the compressor 4, the controller 10 is connected on the input side to a pressure sensor 11 at the accumulator 6, thus allowing the controller 10 to switch the compressor 4 on or off when the air pressure in the accumulator 6 has undershot a lower threshold value or reached an upper threshold value.

The compressor 4 can be switched on and off, for example, by switching on or off an electric motor (not shown) which drives the compressor 4. Instead, it is also possible to open or close a clutch (not shown) by means of which the compressor 4 can be connected in terms of drive to the vehicle engine (not shown).

For control of the valves 8 and 9, the controller 10 is connected on the input side to level transmitters 12, the signals of which represent the distance of the respective vehicle wheel 1 or 2 relative to the body.

The controller 10 is furthermore connected on the input side to a sensor 13, the signals of which represent the transverse and/or longitudinal acceleration of the vehicle body.

The system illustrated operates as follows, a driving state without longitudinal or transverse acceleration of the vehicle body being considered first, i.e. the sensor 13 produces neither a longitudinal nor a transverse acceleration signal.

Before being evaluated, the signals of the level transmitters 12 are always subjected to averaging over time or to low-pass filtering, thus ensuring that the controller 10 takes account only of level changes which are slow or are protracted. The controller 10 comprises a set-value transmitter for the set values of the distances between the vehicle body and the front wheels 1 or rear wheels 2. If appropriate, these set values can be changed by driver actuation of a switch (not shown) or as a function of specified parameters, e.g. the speed of travel.

The controller 10 performs a set/actual value comparison, i.e. the deviation between the set-value signals of the set-value transmitter and the actual-value signals, averaged over time, of the level transmitters 12 is determined. The control and shut-off valves 8 and 9 are actuated as a function of this deviation, such that the set/actual value deviation is eliminated.

According to the invention, level changes which are based on longitudinal and/or transverse accelerations of the vehicle body are not eliminated.

These longitudinal and/or transverse accelerations are detected by means of the sensor 13. These signals are then used by the controller 10 to modify the set values, such that, as a result, level changes due to longitudinal and/or transverse accelerations are not eliminated.

Figure 2:
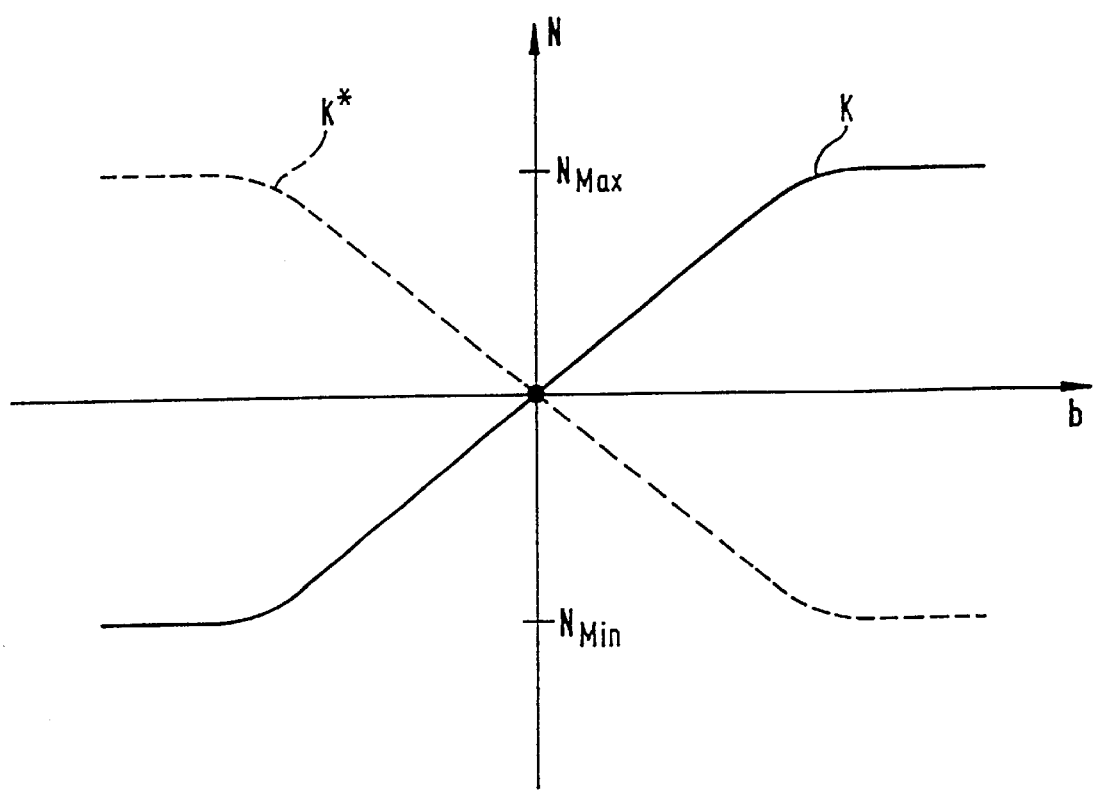

For purposes of explanation, attention is drawn to FIG. 2.

In the diagram in FIG. 2, a parameter b relating to driving dynamics, e.g. the longitudinal acceleration of the vehicle body, is plotted on the abscissa. The ordinate represents the level N of the vehicle body at a vehicle axle, the set level in the example illustrated having the value 0 for the sake of simplicity.

In principle, the set level can be assigned any value. If the set level is assigned the value 0, this merely signifies, mathematically, an expedient calibration which has no effect on the facts of the matter.

The curve K shows the level changes at the front axle in the case where the vehicle is moving on a level roadway, the pressure in the pneumatic spring elements 3 is one at which the actual values of the distances between the wheels 1 and 2 and the vehicle body correspond to the set values when the vehicle is stationary, the spring elements 3 are shut off both from the accumulator 6 and from atmosphere by the valves 8 and 9 and the vehicle is subject to an acceleration b in the longitudinal direction of the vehicle, positive values of b indicating an increase in the speed of the vehicle and negative values of b indicating a reduction in the speed of the vehicle.

The curve K shows how, under the abovementioned conditions, the vehicle body assumes a higher level with increasing acceleration in the case of an acceleration of the vehicle in the sense of an increase in speed, the rise in level reaching a limit $N_{Max}$ with increasing acceleration when the spring travel has been used up.

If, in contrast, the vehicle is decelerated, i.e. if the vehicle is braked and the values of b are accordingly negative, the vehicle body will assume an increasingly lower level at the front axle in the case of forward travel, the fall in level being limited at a value $N_{Min}$ as soon as the possible compression travel has been used up.

Fundamentally similar conditions obtain at the rear axle, but the direction of the level changes is the opposite to that of the level changes at the front axle. This is represented by the curve K* and, once again, a level $N_{Max}$ in the rebound direction and a level $N_{Min}$ in the compression direction cannot be exceeded in the extreme case.

To simplify the illustration, it was assumed here that the achievable limiting values $N_{Max}$ and $N_{Min}$ at the front and rear axles are equal.

According to the invention, the controller 10 can now assign to the acceleration signals b supplied by the sensor 13 the changes in the level of the vehicle body which are to be expected at the front or the rear axle in accordance with the curves K or K*. For this purpose, the values of the level N to be expected which are assigned to the respective values b by way of the curves K and K* can be stored in fundamentally any form, i.e. the controller "knows" the suspension characteristics of the respective vehicle.

As a result, each time a longitudinal acceleration occurs the controller 10 can modify the set values of the levels of the body at the wheels 1 and 2 to the values to be expected, with the result that the level changes caused by the acceleration, in particular pitching movements of the body, do not lead to a set/actual value deviation and movements of the body caused solely by an acceleration are not eliminated.

If b in FIG. 2 denotes the transverse acceleration, positive values of b mean that the respective side of the vehicle is facing in the direction of the transverse acceleration, in particular in the direction of the inside of the bend, while negative values of b mean that the respective side of the vehicle is oriented counter to the direction of the respective transverse acceleration, in particular towards the outside of the bend. Here, curve K shows the conditions at the front axle and curve K* shows the conditions at the rear axle.

In the case of transverse accelerations of the vehicle, in particular due to cornering, this allows the controller 10 to modify the set values for the respective level of the vehicle body at the vehicle wheels 1 and 2 in such a way that level changes caused by transverse accelerations, in particular rolling movements of the body, are not eliminated.

If appropriate, the sensor system can have elements for detecting vehicle loading. This makes it possible to allow for a loading-dependent change in the curves K and K*.

In the case of the pneumatic suspension illustrated in FIG. 1, an increase in vehicle loading leads to an increase in the pressures in the spring elements 3, allowing the vehicle-loading state to be determined by pressure sensors at the spring elements. To avoid a situation where dynamic pressure fluctuations in the spring elements 3 can lead to incorrect results, the signals of the pressure sensors are subjected to averaging over time or to low-pass filtering.

As a departure from the embodiment illustrated in FIG. 1, the acceleration sensor 13 can be omitted and provision can be made for the controller to be connected to sensors (not shown in FIG. 1) for the speed of travel and, if appropriate, also for the steering angle of the front wheels 1, allowing the longitudinal acceleration to be calculated from the change in the speed of travel and the transverse acceleration to be calculated from the speed of travel and the steering angle. For determining the longitudinal and transverse acceleration, it is thus possible to use sensors which are present in any case on vehicles with anti-lock control of the brake system and traction control of the driven wheels.

What is claimed is:

1. A suspension system for a motor vehicle having a body and at least two wheels with a sensor system which detects an actual value of a position of at least one of the wheels relative to the vehicle body and an acceleration of the motor vehicle, and with a ride-height control system which controls control elements to change the position of the wheels as a function of a difference between a set value and an average over time of the actual value of the position of the wheel, characterized in that that movements of the body to be expected on the basis of a detected acceleration of the motor vehicle are not eliminated since the set is changed as a function of the movement of the body to be expected.

2. A suspension system, as set forth in claim 1, characterized in that the control elements operate slowly in comparison with movements of the body caused by accelerations of the vehicle.

3. A suspension system as set forth in claim 1, characterized in that stationary components of the vertical forces acting in each case between the wheel and the body are detected by the sensor system and taken into account in determining the movement of the body to be expected.

4. A suspension system, as set forth in claim 1, characterized in that the detected acceleration is determined from sensor signals which reflect a steering angle of at least one of wheels and a speed of travel of the vehicle.

5. A suspension system, as set forth in claim 2, characterized in that stationary components of the vertical forces acting in each case between the wheel and the body are detected by the sensor system and taken into account in determining the movement of the body to be expected.

6. A suspension system, as set forth in claim 2, characterized in that the detected acceleration is determined from sensor signals which reflect a steering angle of at least one of wheels and a speed of travel of the vehicle.

7. A suspension system, as set forth in claim 3, characterized in that the detected acceleration is determined from sensor signals which reflect a steering angle of at least one of wheels and a speed of travel of the vehicle.

8. A suspension system, as set forth in claim 1, wherein the acceleration of the vehicle is along a longitudinal axis of the body.

9. A suspension system, as set forth in claim 1, wherein the acceleration of the vehicle is along a transverse axis of the body.

10. A suspension system for a motor vehicle having a body and at least two wheels, comprising:
   a position sensor for detecting a position of at least one of the wheels relative to the body and responsively producing a wheel position signal;
   an acceleration signal for detecting an acceleration of the motor vehicle and responsively producing an acceleration signal;
   at least one control assembly coupled to one of the wheels for changing the position of the corresponding wheel relative to the body;
   a controller for receiving the position signal, comparing the wheel position signal to a variable set value and responsively actuating the at least one control assembly as a function of a difference between the position signal and the variable set value and for receiving the acceleration signal and responsively modifying the variable set value as a function thereof such that movements of the body of the motor vehicle as a result of the acceleration of the vehicle are not eliminated.

11. A suspension system, as set forth in claim 8, wherein the controller is adapted to average the position signal over time and compare the variable set value to the average of the position signal.

12. A suspension system for a motor vehicle having a body and first and second wheels, comprising:
   a first position sensor for detecting a position of the first wheel relative to the body and responsively producing a first wheel position signal;
   a second position sensor for detecting a position of the second wheel relative to the body and responsively producing a second wheel position signal;
   an acceleration signal for detecting an acceleration of the motor vehicle and responsively producing an acceleration signal;
   a first control assembly coupled to the first wheel for changing the position of the first wheel relative to the body;
   a second control assembly coupled to the second wheel for changing the position of the second wheel relative to the body;
   a controller for receiving the first and second position signals, comparing the first and second position signals to first and second variable set values, respectively, and responsively actuating the first and second control assemblies as a function of a difference between the first position signal and the first variable set value and a difference between the second position signal and the second variable set value and for receiving the acceleration signal and responsively modifying the first and second variable set values as a function thereof such that movements of the body of the motor vehicle as a result of the acceleration of the vehicle are not eliminated.

13. A suspension system, as set forth in claim 12, wherein the controller is adapted to average the first and second position signals over time and compare the first and second variable set values to the respective average.

14. A suspension system, as set forth in claim 12, wherein the first and second wheels of the motor vehicle are a front wheel and a rear wheel and the acceleration of the vehicle is along a longitudinal axis of the body.

15. A suspension system, as set forth in claim 12, wherein the acceleration of the vehicle is along a transverse axis of the body.

16. A suspension system for a motor vehicle having a body and first, second, third and fourth wheels, comprising:

a first position sensor for detecting a position of the first wheel relative to the body and responsively producing a first wheel position signal;

a second position sensor for detecting a position of the second wheel relative to the body and responsively producing a second wheel position signal;

a third position sensor for detecting a position of the third wheel relative to the body and responsively producing a third wheel position signal;

a fourth position sensor for detecting a position of the fourth wheel relative to the body and responsively producing a fourth wheel position signal;

an acceleration signal for detecting an acceleration of the motor vehicle and responsively producing an acceleration signal;

a first control assembly coupled to the first wheel for changing the position of the first wheel relative to the body;

a second control assembly coupled to the second wheel for changing the position of the second wheel relative to the body;

a third control assembly coupled to the third wheel for changing the position of the third wheel relative to the body;

a fourth control assembly coupled to the fourth wheel for changing the position of the second fourth relative to the body;

a controller for receiving the first, second, third, and fourth position signals, comparing the first, second, third, and fourth position signals to first, second, third, and fourth variable set values, respectively, and responsively actuating the first, second, third, and fourth control assemblies as a function of a difference between the first position signal and the first variable set value, a difference between the second position signal and the second variable set value, a difference between the third position signal and the third variable set value, and a difference between the fourth position signal and the fourth variable set value and for receiving the acceleration signal and responsively modifying the first, second, third, and fourth variable set values as a function thereof such that movements of the body of the motor vehicle as a result of the acceleration of the vehicle are not eliminated.

17. A suspension system, as set forth in claim 16, wherein the first, second, third, and fourth variable set values have equal values.

18. A suspension system, as set forth in claim 16, wherein the controller is adapted to average the first and second position signals over time and compare the first and second variable set values to the respective average.

19. A suspension system, as set forth in claim 16, wherein the first and second wheels of the motor vehicle are a front wheel and a rear wheel and the acceleration of the vehicle is along a longitudinal axis of the body.

20. A suspension system, as set forth in claim 16, wherein the acceleration of the vehicle is along a transverse axis of the body.

* * * * *